(12) United States Patent
Liao et al.

(10) Patent No.: US 9,287,796 B2
(45) Date of Patent: Mar. 15, 2016

(54) ISOLATED POWER CONVERTER CIRCUIT AND CONTROL METHOD THEREOF

(71) Applicants: Chia-Wei Liao, Zhubei (TW); Jing-Meng Liu, Zhubei (TW)

(72) Inventors: Chia-Wei Liao, Zhubei (TW); Jing-Meng Liu, Zhubei (TW)

(73) Assignee: Richtek Technology Corporation, R.O.C., Chupei, Hsinchu (TW)

( * ) Notice: Subject to any disclaimer, the term of this patent is extended or adjusted under 35 U.S.C. 154(b) by 574 days.

(21) Appl. No.: 13/765,609

(22) Filed: Feb. 12, 2013

(65) Prior Publication Data

US 2013/0215651 A1    Aug. 22, 2013

Related U.S. Application Data

(60) Provisional application No. 61/600,628, filed on Feb. 18, 2012.

(51) Int. Cl.
*H02M 3/335* (2006.01)
*H02M 5/40* (2006.01)
*H02M 1/00* (2007.01)

(52) U.S. Cl.
CPC ............ *H02M 5/40* (2013.01); *H02M 3/33523* (2013.01); *H02M 2001/0032* (2013.01); *Y02B 70/16* (2013.01)

(58) Field of Classification Search
CPC ..................... H02M 3/33507; H02M 3/33523; H02M 3/33553; H02M 5/40; H02M 2001/0032; H02M 2001/0035
See application file for complete search history.

(56) References Cited

U.S. PATENT DOCUMENTS

| | | | | |
|---|---|---|---|---|
| 5,689,407 A | * | 11/1997 | Marinus ............ | H02M 3/33523 363/21.12 |
| 5,834,973 A | * | 11/1998 | Klatser .................. | G01R 15/18 330/126 |
| 6,333,862 B1 | * | 12/2001 | Lee .................... | H02M 3/33507 363/21.01 |
| 2011/0018590 A1 | | 1/2011 | Tai et al. | |
| 2011/0157924 A1 | * | 6/2011 | Huynh .............. | H02M 3/33507 363/21.15 |
| 2011/0280051 A1 | * | 11/2011 | Halberstadt ....... | H02M 3/33523 363/78 |

FOREIGN PATENT DOCUMENTS

CN            101207333 A      6/2008

* cited by examiner

*Primary Examiner* — Jessica Han
(74) *Attorney, Agent, or Firm* — Tung & Associates

(57) ABSTRACT

The present invention discloses an isolated power converter circuit and a control method thereof. The isolated power converter circuit includes: a transformer circuit, a power switch circuit, an opto-coupler circuit, and a control circuit. The transformer circuit includes a first winding and a second winding. The power switch circuit is coupled to the transformer circuit to control it according to a driving signal. The opto-coupler circuit generates a feedback signal. The control circuit is coupled to the power switch circuit and the opto-coupler circuit, for generating the driving signal according to the feedback signal. The control circuit includes a distinguishing circuit for distinguishing a status of the feedback signal.

14 Claims, 9 Drawing Sheets

US 9,287,796 B2

ISOLATED POWER CONVERTER CIRCUIT AND CONTROL METHOD THEREOF

CROSS REFERENCE

The present invention claims priority to U.S. 61/600,628, filed on Feb. 18, 2012.

BACKGROUND OF THE INVENTION

1. Field of Invention

The present invention relates to an isolated power converter circuit and a control method thereof; particularly, it relates to such isolated power converter circuit and control method thereof wherein power consumption in a stand-by mode is reduced.

2. Description of Related Art

FIG. 1A shows a schematic diagram of an isolated power converter circuit 100. As shown in FIG. 1A, a voltage Vac is for example an AC voltage signal, which is to be rectified; however, the voltage Vac can be a DC voltage signal. A rectifier circuit 101 rectifies the voltage Vac to generate an input voltage Vin. The rectifier circuit 101 for example is a bridge rectifier circuit. A transformer circuit 102 in the isolated power converter circuit 100 receives the input voltage Vin and converts it to an output voltage Vout. The isolated power converter 100 includes the aforementioned transformer circuit 102, a power switch 103, a control circuit 105, a current sense circuit 106, and a voltage sense circuit 107. The control circuit 105 generates a driving signal GATE according to a current sense signal CS generated by the current sense circuit 106 and a voltage sense signal COMP generated by the voltage sense circuit. The driving signal GATE operates the power switch 103 to convert the input voltage Vin to the output voltage Vout. The transformer circuit 102 includes a first winding W1, a second winding W2, and a third winding W3. The second winding W2 is coupled to a ground level. The first winding W1 and the third winding W3 are coupled to a reference level. The third winding W3 senses the output voltage Vout generated by the second winding W2, and the voltage sense circuit 107 generates the voltage sense signal COMP according to a voltage across the third winding W3.

FIG. 2A shows a schematic diagram of another isolated power converter circuit 200. A control circuit 205 generates the driving signal GATE according to the current sense signal CS generated by the current sense circuit 106 and the voltage sense signal COMP, to control the conversion from the input voltage Vin to the output voltage Vout. This prior art isolated power converter circuit 200 shown in FIG. 2A is different from the prior art isolated power converter circuit 100 shown in FIG. 1A in the feedback mechanism for the information of the output voltage Vout. A voltage sense circuit 207 of the isolated power converter circuit 200 is coupled to an output terminal of the second winding W2 of the transformer circuit 202, which senses the output voltage Vout directly. An opto-coupler circuit 204 converts a sense signal of the output voltage Vout sensed by the voltage sense circuit 207 to an optical signal, and the optical signal is further converted to the voltage sense signal COMP. The voltage sense signal COMP is inputted to the control circuit 205.

Comparing the prior art isolated power converter circuits 100 and 200, the isolated power converter circuit 100 has a drawback of lower control accuracy because it indirectly detects the output voltage Vout, but an advantage of lower power consumption in the stand-by mode or in a light load condition (i.e., the output voltage Vout is maintained at some level and not decreased because of no or low power consumption) because it generates the voltage sense signal COMP by the transformer winding W3 and the voltage sense circuit 107. Referring to FIG. 1B for example, when the isolated power converter circuit 100 is in the stand-by mode, and the voltage Vac is in a range between 80V and 260V, the stand-by mode power consumption Pstb is only several milliwatts (mW). On the other hand, the isolated power converter circuit 200 shown in FIG. 2A has a relatively higher control accuracy because it directly detects the output voltage Vout, but consumes relatively higher power in the stand-by mode or the light load condition because it converts the detection result of the output voltage Vout to the voltage sense signal COMP by the opto-coupler circuit 204. Referring to FIG. 2B, when the isolated power converter circuit 200 is in the stand-by mode, and the voltage Vac is in a range between 90V and 390V, the stand-by mode power consumption Pstb is several tens of milliwatts (mW), which is much higher.

In the prior art isolated power converter circuit 200, a current flowing through the opto-coupler circuit 204 is relatively higher when the isolated power converter circuit 200 is in the stand-by mode or the light load condition, while the current is relatively lower when the isolated power converter circuit 200 is in a normal operation mode. FIG. 2C shows a characteristic curve of the relationship between the current flowing through the opto-coupler circuit 204 (i.e., the opto-coupler current Iopt) and the output voltage Vout. When the isolated power converter circuit 200 is starting up, or when a load circuit consumes power, the output voltage Vout is lower than a voltage level VL; in such conditions, the isolated power converter circuit 200 operates to deliver power to the load circuit (to increase the output voltage Vout), but the opto-coupler current Iopt is relatively lower, and the opto-coupler circuit 204 consumes relatively lower power. When the output voltage Vout is higher than the voltage level VL, the isolated power converter circuit 200 operates in the stand-by mode; in such condition, the isolated power converter circuit 200 is not required to deliver power to the load circuit, but the opto-coupler current Iopt is relatively higher, and the opto-coupler circuit 204 consumes relatively higher power. The above arrangement of the opto-coupler current Iopt is for properly starting the isolated power converter circuit 200 in the starting stage. More specifically, because the power supplied to the opto-coupler circuit 204 is from the output voltage Vout, and the output voltage Vout is low in the starting stage, it must be so arranged that the opto-coupler current Iopt is low when the output voltage Vout is low, and the opto-coupler current Iopt is high when the output voltage Vout is high, such that the isolated power converter circuit 200 is properly feedback controlled according to the opto-coupler current Iopt, and the control circuit 205 which receives the voltage sense signal COMP can distinguish corresponding conditions of the output voltage Vout.

In view of above, to overcome the drawbacks in the prior art shown in FIGS. 1A (poor control accuracy) and 1B (high power consumption in the stand-by mode), the present invention proposes an isolated power converter circuit and a control method thereof, which has a high control accuracy but low the power consumption in the stand-by mode.

For reference, U.S. application 2011/0018590 assigned to the same assignee is related to this invention.

SUMMARY OF THE INVENTION

From one perspective, the present invention provides an isolated power converter circuit, including: a transformer circuit, which includes a first winding and a second winding, for converting an input voltage to an output voltage; a power switch circuit, which is coupled to the first winding, for controlling the transformer to convert the input voltage to the output voltage according to a driving signal; an opto-coupler circuit, which has a first opto-coupler coupled to the second winding, for generating a feedback signal according to the output voltage; and a control circuit, which are coupled to the power switch circuit and the opto-coupler circuit, for generating the driving signal according to the feedback signal, wherein the control circuit includes: a distinguishing circuit for generating a distinguishing signal by directly or indirectly determining a status of the feedback signal; and a driving signal generation circuit for determining, by the distinguishing signal, whether or not generating the driving signal according to the feedback signal; wherein the isolated power converter circuit has a normal operation mode and a stand-by mode, wherein when the isolated power converter circuit operates in the stand-by mode, an opto-coupler current flowing through the opto-coupler circuit is less than a maximum level of the opto-coupler current flowing through the opto-coupler circuit when the isolated power converter circuit operates in the normal operation mode.

From another perspective, the present invention provides a control circuit of an isolated power converter circuit, wherein the isolated power converter circuit includes: a transformer circuit, which includes a first winding and a second winding, for converting an input voltage to an output voltage; a power switch circuit, which is coupled to the first winding; an opto-coupler circuit, having an opto-coupler coupled to the second winding, for generating a feedback signal according to the output voltage, the control circuit including: a distinguishing circuit for generating a distinguishing signal by directly or indirectly determining a status of the feedback signal; and a driving signal generation circuit for determining, by the distinguishing signal, whether or not generating the driving signal according to the feedback signal.

In one preferable embodiment, the driving signal generation circuit generates the driving signal according to the feedback signal when the output voltage is not larger than a first predetermined voltage, and the driving signal generation circuit stops operating or stop generating the driving signal according to the feedback signal when the output voltage is larger than a second predetermined voltage, wherein the second predetermined voltage is not smaller than the first predetermined voltage.

In another preferable embodiment, when the output voltage is not larger than a first predetermined voltage, the feedback signal is an increasing function which increases as the output voltage increases, when the output voltage is larger than a second predetermined voltage, the feedback signal is a decreasing function which decreases as the output voltage decreases.

In another preferable embodiment, the transformer circuit further includes a third winding coupled to a same reference level as the first winding, for detecting the output voltage to generate a third winding signal; and the distinguishing circuit includes a first level determination circuit, which is coupled to the third winding, for generating the distinguishing signal according to the third winding signal when the output voltage is larger than the second predetermined voltage.

In another preferable embodiment, the first level determination circuit or the driving signal generation circuit is further coupled to the opto-coupler circuit, for generating a disable signal to turn OFF the first opto-coupler when the output voltage is larger than the second predetermined voltage.

In another preferable embodiment, the opto-coupler circuit further includes a second opto-coupler, which is coupled to the second winding, for generating a stand-by signal according to the output voltage In another preferable embodiment, the distinguishing circuit includes an enable circuit, which is coupled to the second opto-coupler, for generating an enable signal functioning as the distinguishing signal according to the stand-by signal or a signal related to the stand-by signal.

In another preferable embodiment, the first opto-coupler is turned OFF when the output voltage is larger than the second predetermined voltage.

In another preferable embodiment, the opto-coupler circuit further includes a second level determination circuit, for turning OFF the first opto-coupler when the output voltage is larger than the second predetermined voltage.

In another preferable embodiment, the opto-coupler circuit further includes a current determination circuit, for turning OFF the first opto-coupler for a period of time when a first opto-coupler current flowing through the first opto-coupler is larger than a predetermined current.

In another preferable embodiment, a first opto-coupler current flowing through the first opto-coupler circuit is an increasing function which increases as the output voltage increases in the normal operation mode, and a second opto-coupler current flowing through the second opto-coupler circuit is an increasing function which increases as the output voltage increases, or the second opto-coupler current is an increasing function which increases as the output voltage increases when the output voltage is relatively low, and the second opto-coupler current is a decreasing function which decreases as the output voltage increases when the output voltage is relatively high.

From another perspective, the present invention provides a control method of an isolated power converter circuit, including: driving the isolated power converter circuit by a driving signal to convert an input voltage to an output voltage; generating a first opto-coupler current by opto-coupling according to the output voltage, for generating a feedback signal corresponding to the first opto-coupler current; generating a distinguishing signal by directly or indirectly determining a status of the feedback signal; and determining by the distinguishing signal whether or not generating the driving signal according to the feedback signal; wherein the isolated power converter circuit has a normal operation mode and a stand-by mode, wherein when the isolated power converter circuit operates in the stand-by mode, the first opto-coupler current is less than a maximum level of the first opto-coupler current when the isolated power converter circuit operates in the normal operation mode.

In one preferable embodiment, the driving signal is generated according to the feedback signal when the output voltage is not larger than a first predetermined voltage, and the driving signal is not generated according to the feedback signal when the output voltage is larger than a second predetermined voltage, wherein the second predetermined voltage is not smaller than the first predetermined voltage.

In another preferable embodiment, when the output voltage is not larger than a first predetermined voltage, the first opto-coupler current is an increasing function which increases as the output voltage increases, when the output voltage is larger than a second predetermined voltage, the first opto-coupler current is a decreasing function which decreases as the output voltage decreases.

In another preferable embodiment, the control method further includes: generating the distinguishing signal by determining a level of the output voltage.

In another preferable embodiment, the control method further includes: stopping generating the first opto-coupler current by opto-coupling when the output voltage is larger than the second predetermined voltage.

In another preferable embodiment, the control method further includes: generating a second opto-coupler current by opto-coupling according to the output voltage, for generating a stand-by signal.

In another preferable embodiment, the distinguishing signal is generated according to the stand-by signal.

In another preferable embodiment, the control method further includes: stopping generating the first opto-coupler current by opto-coupling when the output voltage is larger than the second predetermined voltage.

In another preferable embodiment, the control method further includes: stopping generating the first opto-coupler current by opto-coupling for a period of time when the first opto-coupler current is larger than a predetermined current.

In another preferable embodiment, the second opto-coupler current is less than a maximum level of the first opto-coupler current.

In another preferable embodiment, the first opto-coupler current is an increasing function which increases as the output voltage increases in the normal operation mode, and the second opto-coupler current is an increasing function which increases as the output voltage increases, or the second opto-coupler current is an increasing function which increases as the output voltage increases when the output voltage is relatively low, and the second opto-coupler current is a decreasing function which decreases as the output voltage increases when the output voltage is relatively high.

The objectives, technical details, features, and effects of the present invention will be better understood with regard to the detailed description of the embodiments below.

DESCRIPTION OF THE PREFERRED EMBODIMENTS

Figure 1A:
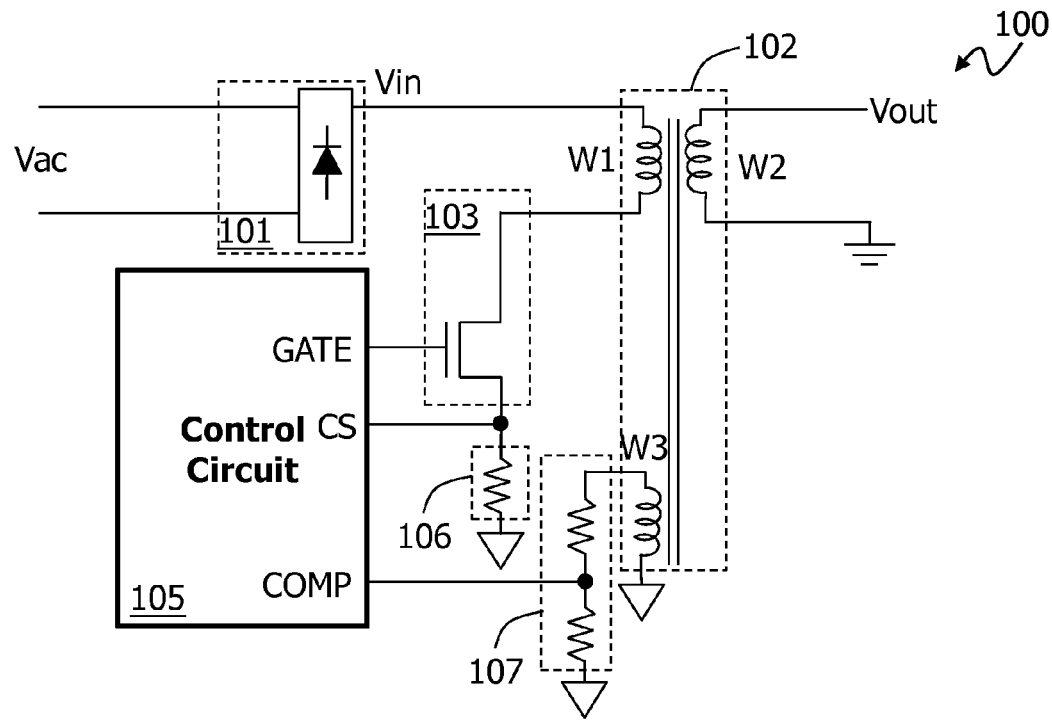
FIG. 1A shows a schematic diagram of an isolated power converter circuit 100.
Figure 2A:
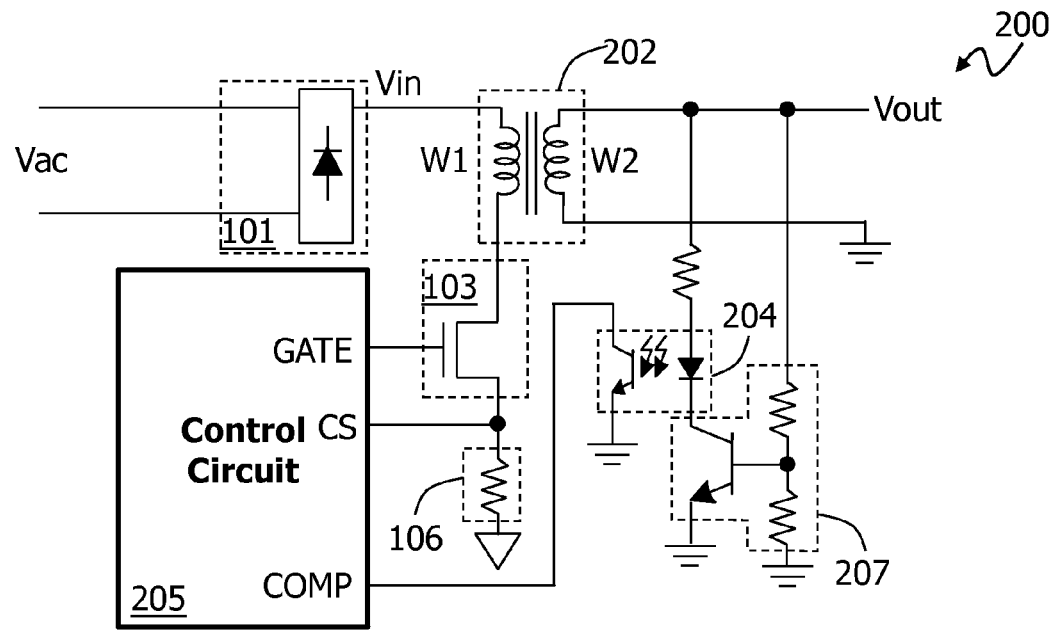
FIG. 2A shows a schematic diagram of another isolated power converter circuit 200.
Figure 1B:
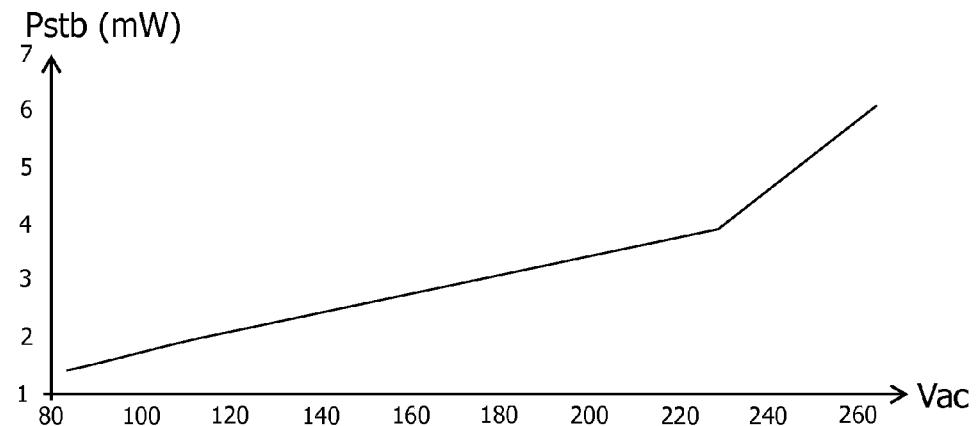
FIGS. 1B and 2B show stand-by mode power consumption Pstb of the isolated power converter circuits 100 and 200.
Figure 2B:
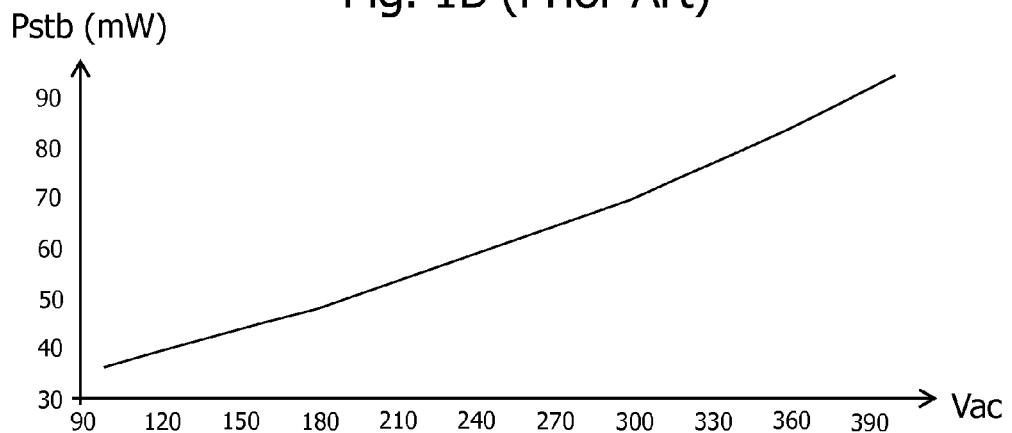
Figure 2C:
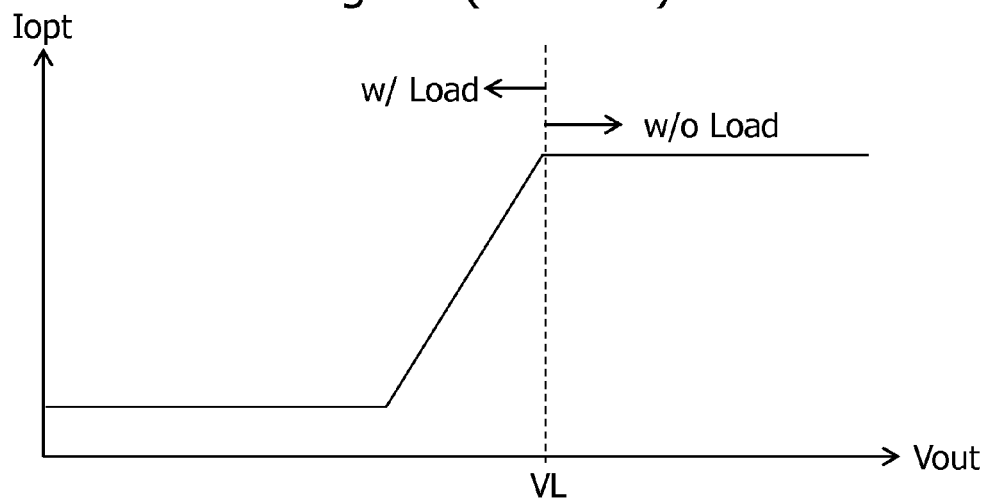
FIG. 2C shows a characteristic curve of the relationship between the current flowing through an opto-coupler circuit 204 (i.e. opto-coupler current Iopt) and the output voltage Vout.
Figure 3:
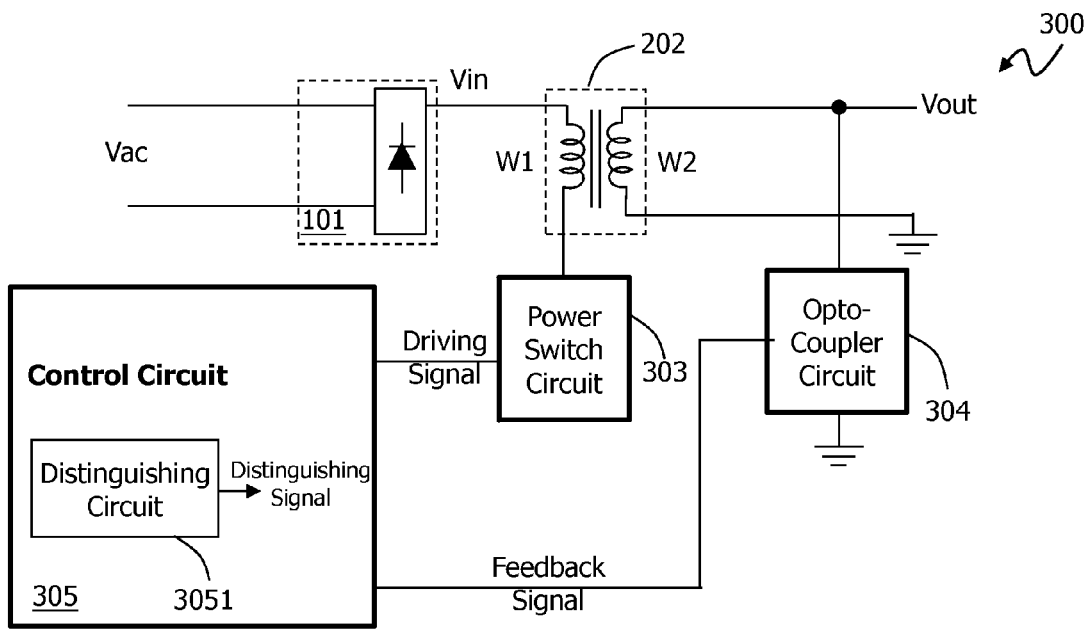
FIG. 3 shows a first embodiment of the present invention.

FIG. 3 shows a first embodiment of the present invention. As shown in FIG. 3, an isolated power converter circuit 300 includes a transformer circuit 202, a power switch circuit 303, an opto-coupler circuit 304, and a control circuit 305. The transformer circuit 202 includes a first winding W1 and a second winding W2, for converting the input voltage Vin to the output voltage Vout. The power switch circuit 303 is coupled to the first winding W1 and it operates a power switch therein according to a driving signal, so as to control the transformer circuit 202 for converting the input voltage Vin to the output voltage Vout. The opto-coupler circuit 304 is coupled to the second winding W2, for generating a feedback signal. The control circuit 305 is coupled to the power switch circuit 303 and the opto-coupler circuit 304, for generating the driving signal according to the feedback signal. The control circuit 305 includes a distinguishing circuit 3051, for determining a status of the feedback signal and generating a distinguishing signal (wherein "determining a status of the feedback signal" can be done with reference to any information, not limited to the information directly from the feedback signal; for example, the status of the feedback signal can be determined according to the output voltage Vout or a signal related to the output voltage Vout; however certainly, the status of the feedback signal can be determined according to the feedback signal itself or a signal related to the feedback signal). Why the distinguishing circuit is required will be explained with reference to FIG. 4. The embodiments of the distinguishing circuit will be described in detail later.

Figure 4:
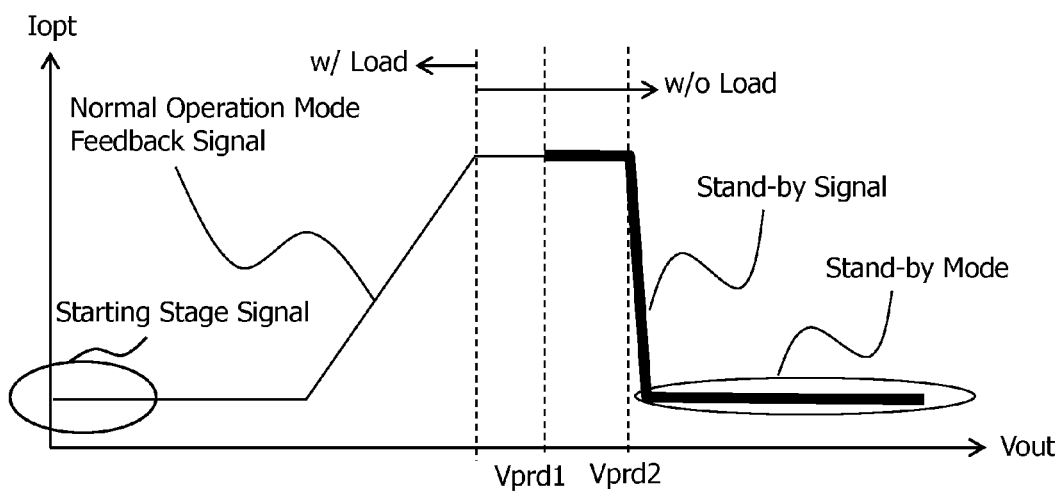
FIG. 4 shows a characteristic curve of the relationship between the opto-coupler current Iopt flowing through an opto-coupler circuit 304 and the output voltage Vout in the first embodiment according to the present invention.

FIG. 4 shows a characteristic curve of the relationship between the opto-coupler current Iopt flowing through an opto-coupler circuit 304 and the output voltage Vout, in the first embodiment according to the present invention. The opto-coupler current Iopt includes two parts, one of which is referred to as a normal operation mode feedback signal as shown by the thin solid line in the figure, which corresponds to the case when the output voltage Vout is not larger than a predetermined voltage Vprd1, and the other of which is referred to as a stand-by signal as shown by the thick solid line in the figure, which corresponds to the case when the output voltage Vout is larger than a predetermined voltage Vprd2. The feedback signal generated by the opto-coupler circuit 304 correlates to the opto-coupler current Iopt, so the characteristic curve shown in FIG. 4 may be considered also as the relationship between the feedback signal and the output voltage Vout. That is, when the opto-coupler current Iopt is the normal operation mode feedback signal, the control circuit 305 generates the driving signal according to the feedback signal generated by the opto-coupler circuit 304, and the driving signal controls the power switch circuit 303 to convert the input voltage Vin to the output voltage Vout; when the opto-coupler current Iopt is the stand-by signal, the control circuit 305 does not generate the driving signal according to the feedback signal generated by the opto-coupler circuit 304, or stops (fully stops or at least intermittently stops) controlling the power switch circuit 303, such that the isolated power converter enters the stand-by mode. The predetermined voltage Vprd2 is not smaller than the first predetermined voltage Vprd1; the predetermined voltage Vprd2 may be equal to the first predetermined voltage Vprd1. In the aforementioned arrangement according to the present invention, the power consumption can be reduced because the opto-coupler current Iopt is decreased in the stand-by mode.

However, in the aforementioned arrangement, one same opto-coupler current Iopt may correspond to different output voltages Vout; therefore, according to the present invention, the control circuit 305 includes a distinguishing circuit 3051, which distinguishes which status of the output voltage Vout the feedback signal corresponds to, among at least two of the statuses including: a starting mode, the normal operation mode, and the stand-by mode. The distinguishing circuit 3051 may be embodied in various ways, and they will be described in detail later. The present invention will focus more on the distinguishing circuit; as to how the opto-coupler circuit generates the opto-coupler current Iopt as shown in FIG. 4, the present invention will describe it in less detail, and for reference, please refer to US 2011/0018590 of the same assignee as the present invention.

Figure 5:
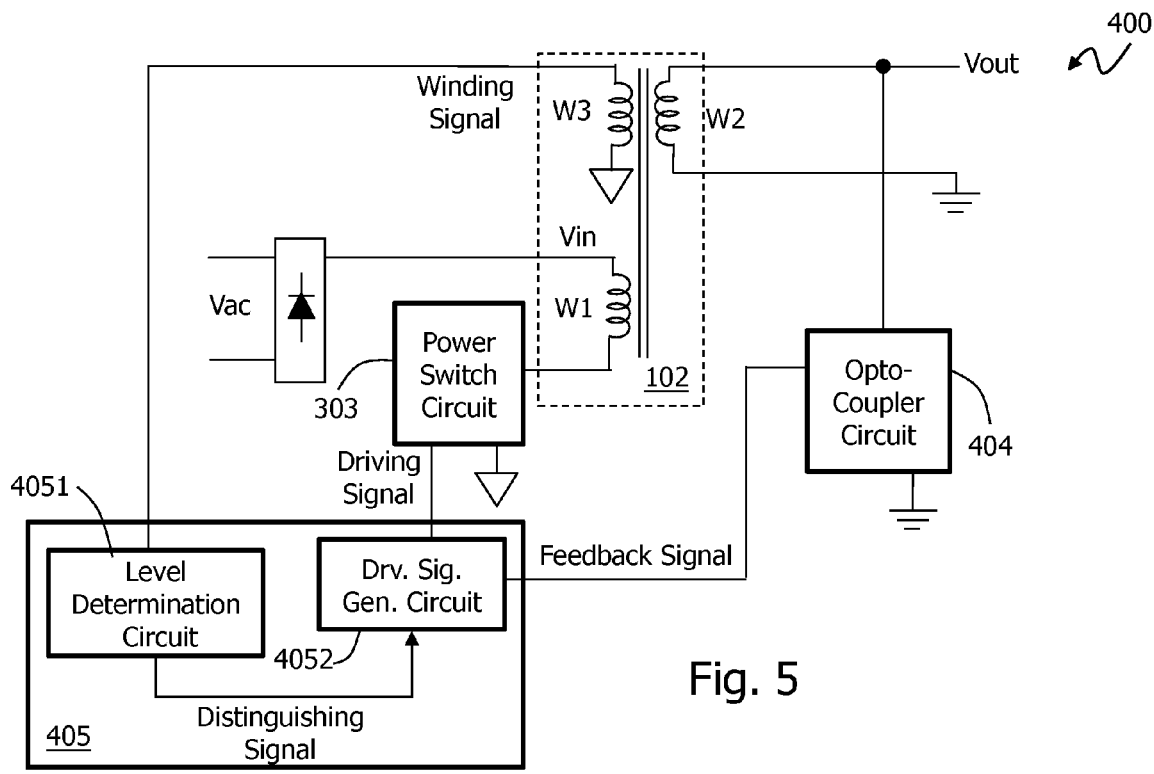
FIG. 5 shows a second embodiment of the present invention.

FIG. 5 shows a second embodiment of the present invention. As shown in FIG. 5, in an isolated power converter circuit 400, the transformer circuit 102 further includes a third winding W3 besides the first and second windings W1 and W2, wherein the third winding W3 and the first winding W1 are coupled to the same reference level. The third winding W3 detects the output voltage Vout and generates a winding signal. The control circuit 405 includes a level determination circuit 4051 and a driving signal generation circuit (Drv. Sig. Gen. Circuit) 4052. The level determination circuit 4051 is coupled to the third winding W3 and it generates the distinguishing signal according to the winding signal. The distinguishing signal is transmitted to the driving signal generation circuit 4052, such that when the output voltage Vout is not larger than the predetermined voltage Vprd1, the driving signal generation circuit 4052 generates the driving signal according to the feedback signal, while when the output voltage Vout is larger than the predetermined voltage Vprd2, the driving signal generation circuit 4052 stops operation (or stops operating according to the feedback signal, but still outputting a predetermined signal), so that the isolated power converter circuit 400 enters the stand-by mode.

Figure 6:
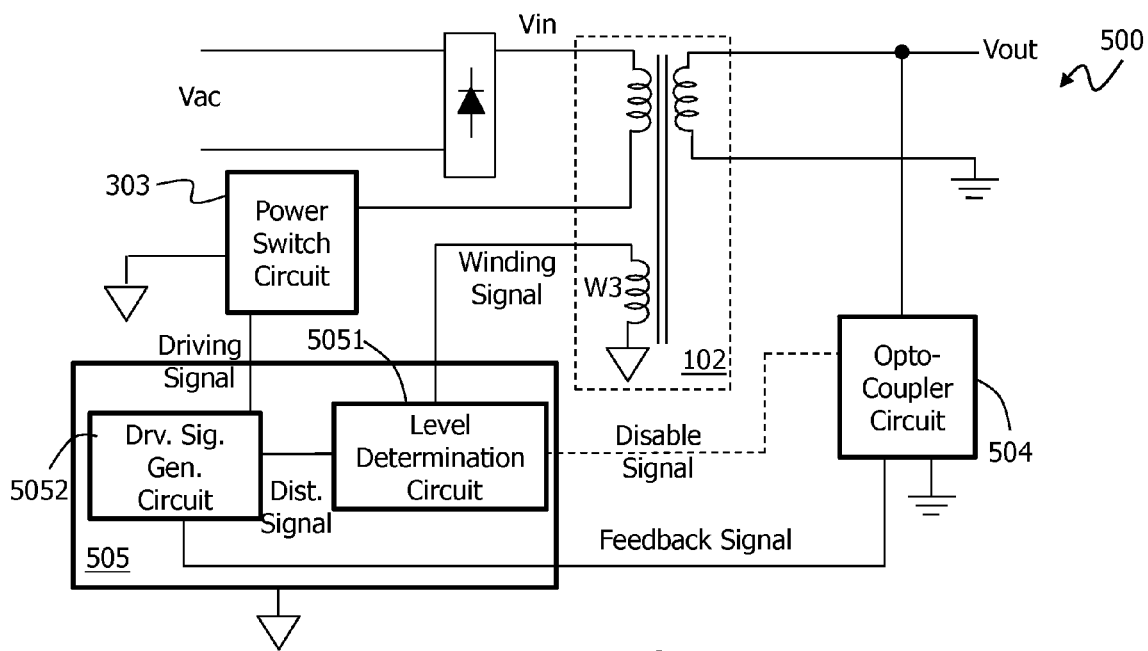
FIG. 6 show a third embodiment of the present invention.

FIG. 6 shows a third embodiment of the present invention. This embodiment is similar to the second embodiment in that, in an isolated power converter circuit 500 of this embodiment, the transformer circuit 102 also has the third winding W3, which generates the winding signal according to the output voltage Vout. A control circuit 505 includes a level determination circuit 5051 and a driving signal generation circuit 5052. The level determination circuit 5051 is coupled to the third winding W3 and the driving signal generation circuit 5052, and it generates the distinguishing signal (Dist. Signal) according to the winding signal. This embodiment is different from the second embodiment in that, as shown in FIG. 6, when the level determination circuit 5051 determines that the output voltage Vout is larger than the predetermined voltage Vprd2, the level determination circuit 5051 further generates for example but not limited to a disable signal, such that the opto-coupler circuit 504 is turned OFF according to the disable signal (as indicated by the dash line shown in the figure), and the power consumption may be further reduced.

Note that, in describing that "the output voltage Vout is larger than the predetermined voltage Vprd2", the term "larger" is correlated to the electric polarity of the output voltage Vout. For example, when the output voltage vout is a positive voltage, the sentence "the output voltage Vout is larger than the predetermined voltage Vprd2" means that the positive output voltage Vout is higher than the positive predetermined voltage Vprd2; when the output voltage vout is a negative voltage, the sentence "the output voltage Vout is larger than the predetermined voltage Vprd2" means that the absolute value of the negative output voltage Vout is higher than the absolute value of the negative predetermined voltage Vprd2. The above is applicable to the other larger/smaller and higher/lower relationships described in this specification.

Figure 7:
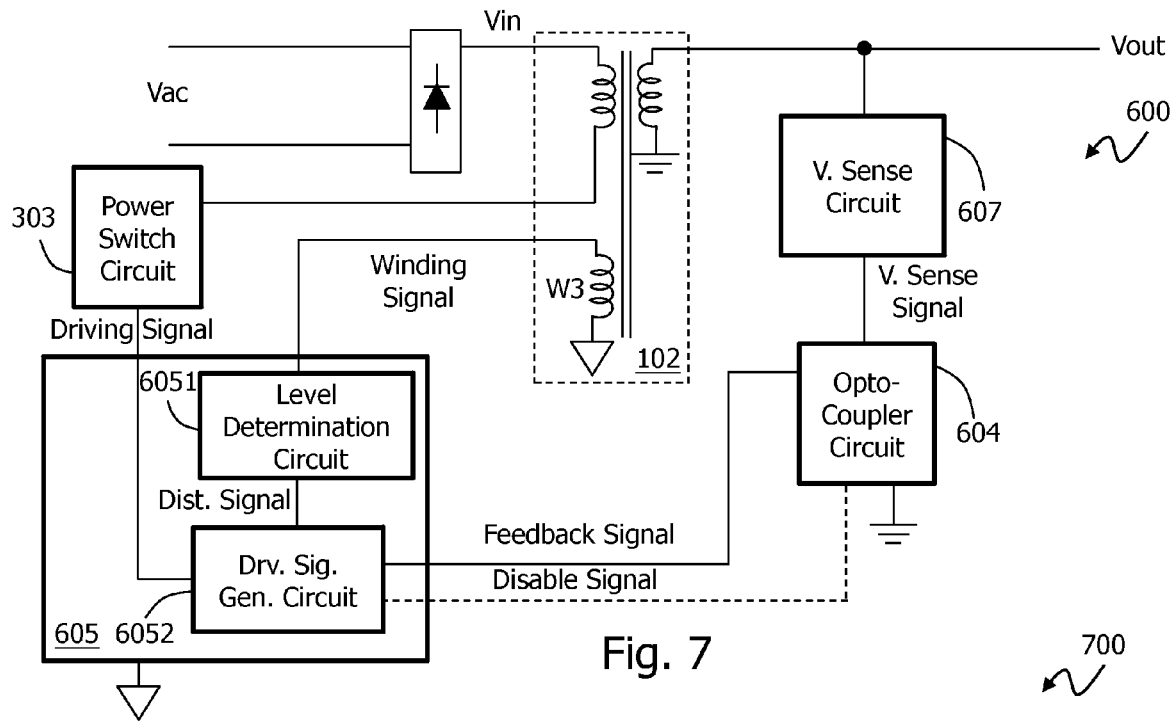
FIG. 7 shows a fourth embodiment of the present invention.

FIG. 7 shows a fourth embodiment of the present invention. As shown in FIG. 7, an isolated power converter circuit 600 includes the transformer circuit 102, the power switch circuit 303, an opto-coupler circuit 604, a control circuit 605, and a voltage sense circuit (V. Sense Circuit) 607. This embodiment indicates that, when the output voltage Vout is relatively higher and it is undesirable to directly connect the opto-coupler circuit 604 to the output voltage Vout, the output voltage Vout may be detected by the voltage sense circuit 607, to generate a voltage sense signal (V. Sense Signal) which is related to and representative of the output voltage Vout. Besides, the disable signal is not necessarily generated by the level determination circuit 6051; instead, it may be generated by the driving signal generation circuit 6052 according to the distinguishing signal.

Figure 8:
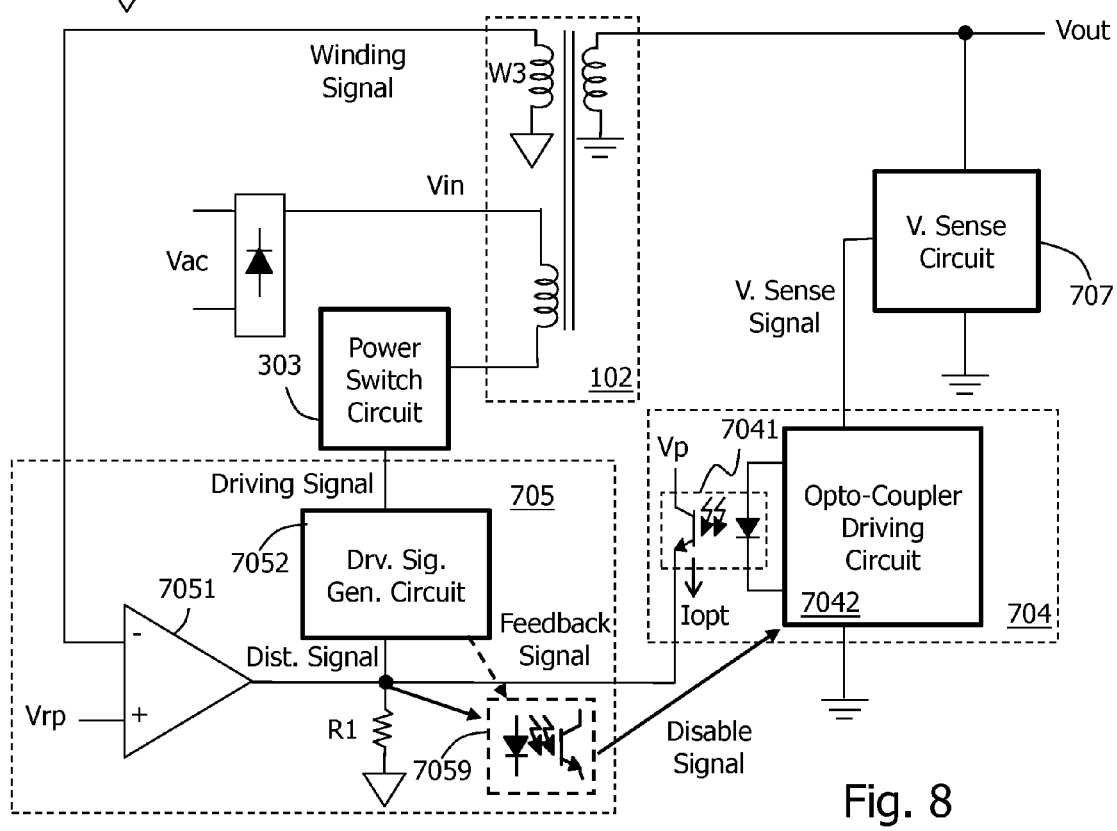
FIG. 8 shows a fifth embodiment of the present invention.

FIG. 8 shows a fifth embodiment of the present invention. As shown in FIG. 8, an isolated power converter circuit 700 includes the transformer circuit 102, the power switch circuit 303, an opto-coupler circuit 704, a voltage sense circuit 707, and a control circuit 705. In this embodiment, the opto-coupler circuit 704 includes an opto-coupler 7041 and an opto-coupler driver circuit 7042. The voltage sense circuit 707 generates a voltage sense signal according to the output voltage Vout. The opto-coupler driver circuit 7042 drives the opto-coupler 7041 according to the voltage sense signal, so as to generate the feedback signal. The control circuit 705 includes a level determination circuit 7051 and a driving signal generation circuit 7052. As shown in the figure, the level determination circuit 7051 is for example but not limited to a comparator, an operational amplifier, or a trans-conductance amplifier circuit (these three have similar circuit structures, and will be referred to by a genius term "comparison circuit" hereinafter) which is coupled to the third winding W3. The level determination circuit 7051 compares the winding signal with a reverse reference signal Vrp, and generates the distinguishing signal according to the comparison result. The reverse reference signal Vrp is for determining whether the output voltage is smaller than the predetermined voltage Vprd1 or larger than the predetermined voltage Vprd2, and therefore the reverse reference signal Vrp can be set as either one of the predetermined voltage Vprd1 or the predetermined voltage Vprd2, or any value in between. The driving signal generation circuit 7052 is coupled to the level determination circuit 7051, and it generates the driving signal according to the distinguishing signal. In this embodiment, the output signal of the comparison circuit serves as the distinguishing signal on one hand, and also as the disable signal on the other hand (the disable signal may be generated by the driving signal generation circuit instead). For example, as shown in the figure, the disable signal may be inputted to the secondary side through another low current opto-coupler 7059 for stopping or reducing the opto-coupler current flowing through the opto-coupler 7041. The disable signal outputted from the opto-coupler 7059 can be a digital signal instead of a precise analog signal; therefore, the opto-coupler 7059 for example may be an opto-coupler operating with a low current, such that the power consumption in the stand-by mode may be reduced. For another example, referring to FIG. 8, the output terminal of the comparison circuit is coupled to a reference level through a resistor R1, and an output transistor in the opto-coupler 7041 is coupled for example between an internal voltage Vp and the resistor R1. Therefore, when a voltage across the resistor R1 is substantially equal to or higher than the internal voltage Vp, the output transistor in the opto-coupler 7041 is turned OFF. From this perspective, the voltage across the resistor R1 may be considered as the disable signal. Even though the disable signal does not turn OFF the opto-coupler 7041 entirely, the opto-coupler current Iopt becomes zero or a low current closed to zero, so the power consumption of the opto-coupler circuit 704 in the stand-by mode is reduced at least to a certain extent.

Figure 9A:
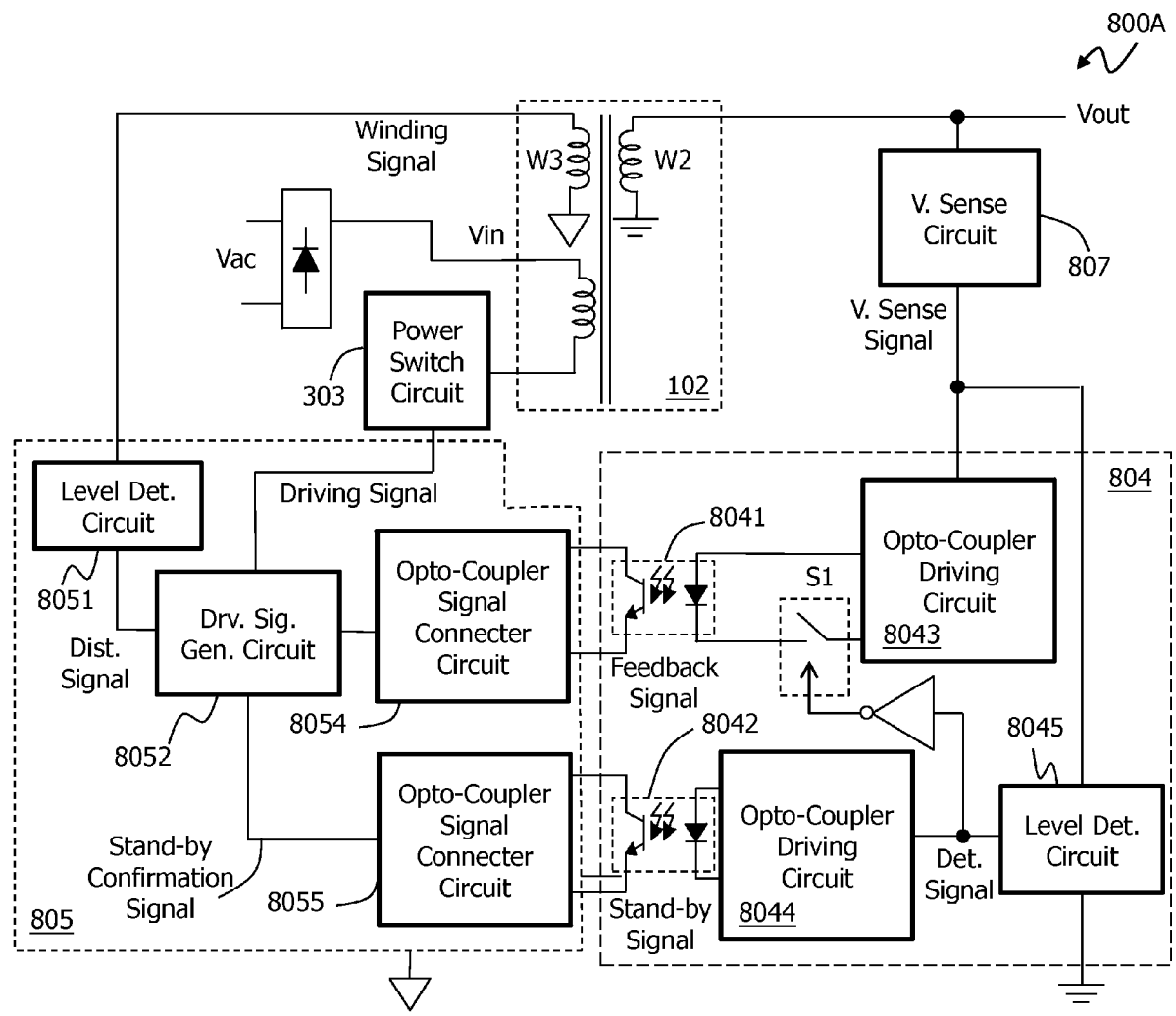
FIGS. 9A-9B show sixth and seventh embodiments of the present invention.

FIG. 9A shows a sixth embodiment of the present invention. As shown in FIG. 9A, an isolated power converter circuit 800A includes the transformer circuit 102, the power switch circuit 303, an opto-coupler circuit 804, a control circuit 805, and a voltage sense circuit 807. In this embodiment, the opto-coupler circuit 804 includes opto-couplers 8041 and 8042, opto-coupler driver circuits 8043 and 8044, and a level determination circuit 8045. The voltage sense circuit 807 generates a voltage sense signal according to the output voltage Vout. The level determination circuit 8045 generates a determination signal according to the voltage sense signal. When the output voltage Vout is not larger than the predetermined voltage Vprd1, i.e., the isolated power converter circuit 800A is not in the stand-by mode, the determination signal turns ON the switch S1, such that the opto-coupler driver circuit 8043 drives the opto-coupler 8041 to generate the feedback signal according to the voltage sense signal. In the meantime, the determination signal turns OFF the opto-coupler driver circuit 8044, or controls the opto-coupler driver circuit 8044 in any suitable way, such that the opto-coupler 8042 does not generate the stand-by signal, or the stand-by signal generated by the opto-coupler 8042 indicates that the isolated power converter circuit 800A is in the normal operation mode. When the output voltage Vout is larger than the predetermined voltage Vprd2, the determination signal generated by the level determination circuit 8045 enables the opto-coupler driver circuit 8044 to drive the opto-coupler 8042 to generate the stand-by signal, indicating that the isolated power converter circuit 800A is in the stand-by mode. In the meantime, the determination signal turns OFF the switch S1, such that the opto-coupler 8041 is turned OFF, and the power consumption of the opto-coupler 8041 is reduced. Because the primary function of the opto-coupler 8042 is to generate the stand-by signal when the output voltage Vout is larger than the predetermined voltage Vprd2, wherein the stand-by signal is not necessary to be a precise signal as the feedback signal, the opto-coupler 8042 can be an opto-coupler operating with a low current, such that the power consumption in the stand-by mode may be reduced (This will be further explained with reference to FIG. 10).

In this embodiment, the control circuit 805 includes a level determination circuit 8051, a driving signal generation circuit 8052, and opto-coupler signal connector circuits 8054 and 8055. The level determination circuit 8051 is coupled to the third winding W3, and it generates the distinguishing signal according to the winding signal. when the output voltage Vout is not larger than the predetermined voltage Vprd1, the distinguishing signal enables the driving signal generation circuit 8052 to generate the driving signal according to the feedback signal which is generated by the opto-coupler 8041 and transmitted through the opto-coupler signal connector circuits 8054, such that the power switch circuit 303 is controlled thereby. such that the isolated power converter circuit 800A operates in the normal operation mode. When the output voltage is larger than the predetermined voltage Vprd2, the distinguishing signal enables the driving signal generation circuit 8052 to operate according to an output signal of the opto-coupler signal connector circuit 8055 (i.e., a stand-by confirmation signal), and in the meantime, the isolated power converter circuit 800A is in the stand-by mode.

Figure 10:
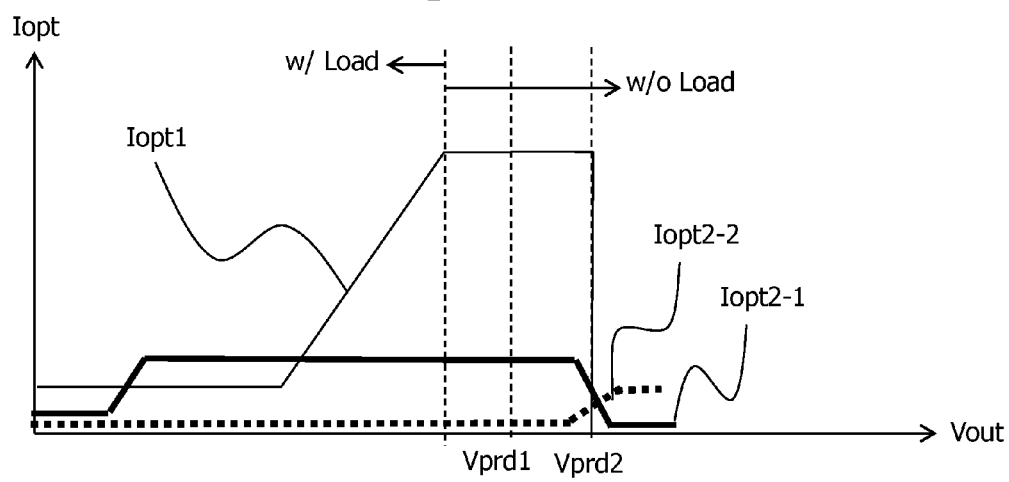
FIG. 10 shows characteristic curves of the relationships between the opto-coupler currents Iopt1, Iopt2-1, Iopt2-2 and the output voltage Vout.

FIG. 10 shows characteristic curves of the relationships between the opto-coupler currents Iopt1 flowing through the opto-coupler 8041, and Iopt2-1 and Iopt2-2 flowing through the opto-coupler 8042, and the output voltage Vout in the aforementioned sixth embodiment. When the output voltage Vout is not larger than the predetermined voltage Vprd1, the feedback signal is generated according to the opto-coupler current Iopt1 flowing through the opto-coupler 8041 (as indicated by the thin solid line), so as to generated the driving signal. When the output voltage Vout is larger than the predetermined voltage Vprd2, the opto-coupler 8042 is turned OFF, and therefore the opto-coupler current Iopt1 is zero, consuming no power. On the other hand, the opto-coupler current flowing through the opto-coupler 8042 may be the waveform Iopt2-1 (indicated by the thick solid line) or Iopt2-2 (indicated by the thick dash line), both of which may be arranged to be very low. In the former (Iopt2-1) condition, the opto-coupler current flowing through the opto-coupler 8042 has a reverse shape which is similar to the waveform shown in FIG. 4 (i.e., when the output voltage Vout is relatively lower, the opto-coupler current Iopt2-1 is an increasing function which increases as the output voltage Vout increases, and when the output voltage Vout is relatively higher, the opto-coupler current Iopt2-1 is a decreasing function which decreases as the output voltage Vout increases). Even though the same levels of the optcoupler current Iopt2-1 may correspond to different output voltages, the distinguishing signal which is generated by the level determination circuit 8051 can distinguish them, so the isolated power converter 800A shown in FIG. 9A can enter the stand-by mode correctly. Note that when the voltage supply (or power source) of the opto-coupler 8042 is from the output voltage Vout, the opto-coupler 8042 will naturally generate the left side of the waveform Iopt2-1 when the output voltage Vout is low, so in one embodiment of the present invention, the opto-coupler driving circuit 8044 only needs to drive the opto-coupler 8042 to generate right side of the waveform Iopt2-1 according to the output signal of the level determination circuit 8045 but does not need to actually sense the output voltage Vout. Therefore, as shown in the figure, the voltage sense signal is only provided to the opto-coupler driving circuit 8043, but not the opto-coupler driving circuit 8044. However certainly, it also within the scope of the present invention for the opto-coupler driving circuit 8044 to generate the waveform Iopt2-1 according to the voltage sense signal. In the later (Iopt2-2) condition, the opto-coupler current flowing through the opto-coupler 8042 is the typical waveform, i.e., it is an increasing function which increases as the output voltage Vout increases. Even though the power consumption in the stand-by mode (higher output voltage Vout) is higher than the normal operation mode (lower output voltage Vout), the power consumption of this embodiment is lower than the prior art because the primary function of the opto-coupler 8042 is to generate the stand-by signal instead of the precise feedback signal, and the opto-coupler current which is generated by the opto-coupler 8042 may be arranged to be very low, i.e., the largest opto-coupler current generated by the opto-coupler 8042 is much lower than the largest opto-coupler current generated by the opto-coupler 8041. Because the major power consumption by the opto-coupler 8041 is turned OFF in the stand-by mode, the power consumption of the whole circuitry may be reduced.

Figure 9B:
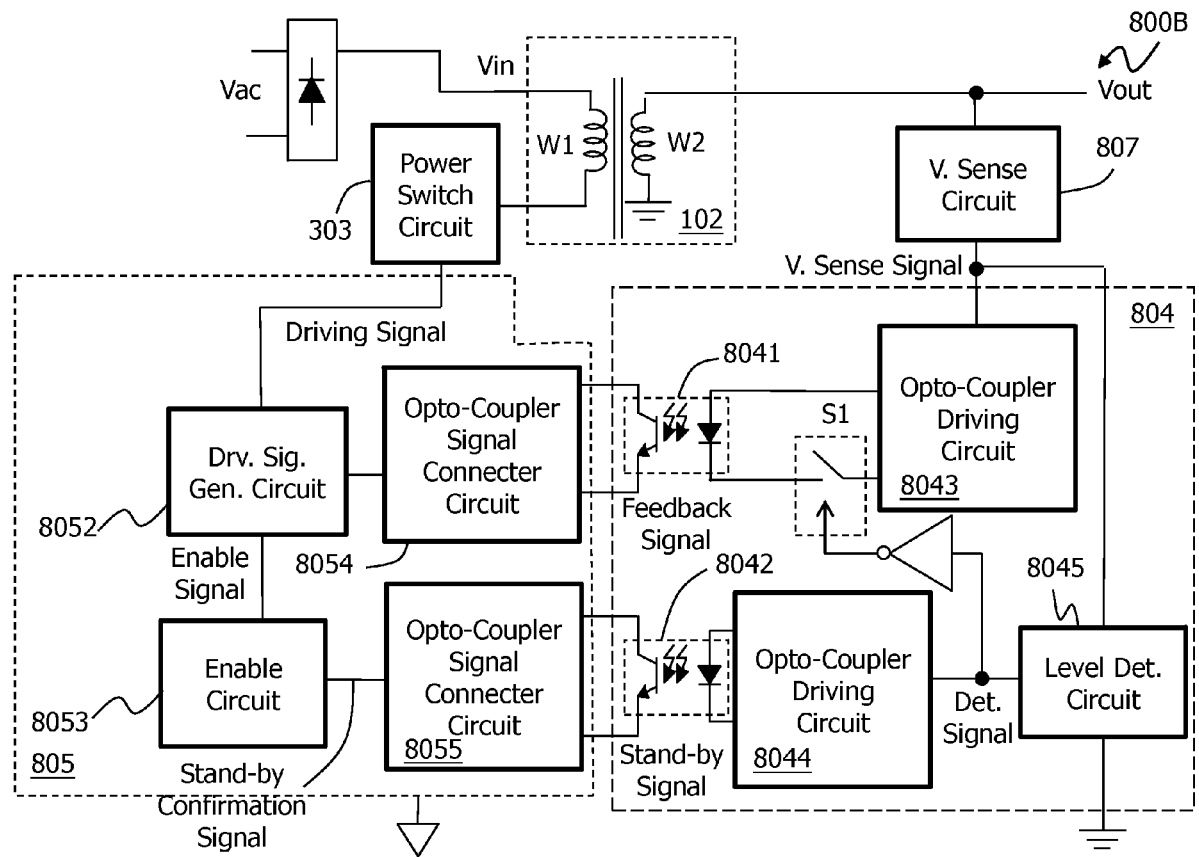

The level determination circuits in the aforementioned embodiments correspond to the distinguishing circuit 3051 shown in FIG. 3, but the distinguishing circuit 3051 is not limited to being embodied as these level determination circuits; please refer to FIG. 9B.

FIG. 9B shows a seventh embodiment of the present invention. This embodiment is different from the sixth embodiment in that, in this embodiment, the level determination circuit 8051 and the third winding are omitted; besides, the control circuit 805 includes the driving signal generation circuit 8052, an enable circuit 8053, and the opto-coupler signal connector circuits 8054 and 8055. The enable circuit 8053 generates an enable signal according to the stand-by confirmation signal which is outputted from the opto-coupler signal connector circuit 8055. When the isolated power converter circuit 800B enters the stand-by mode, the enable signal generated by the enable circuit 8053 turns OFF (disables) the driving signal generation circuit 8052. When the isolated power converter circuit 800B enters the normal operation mode, the enable signal generated by the enable circuit 8053 enables the driving signal generation circuit 8052. In this embodiment, the enable circuit 8053 corresponds to the distinguishing circuit 3051, and the enable signal corresponds to the distinguishing signal.

Figure 11:
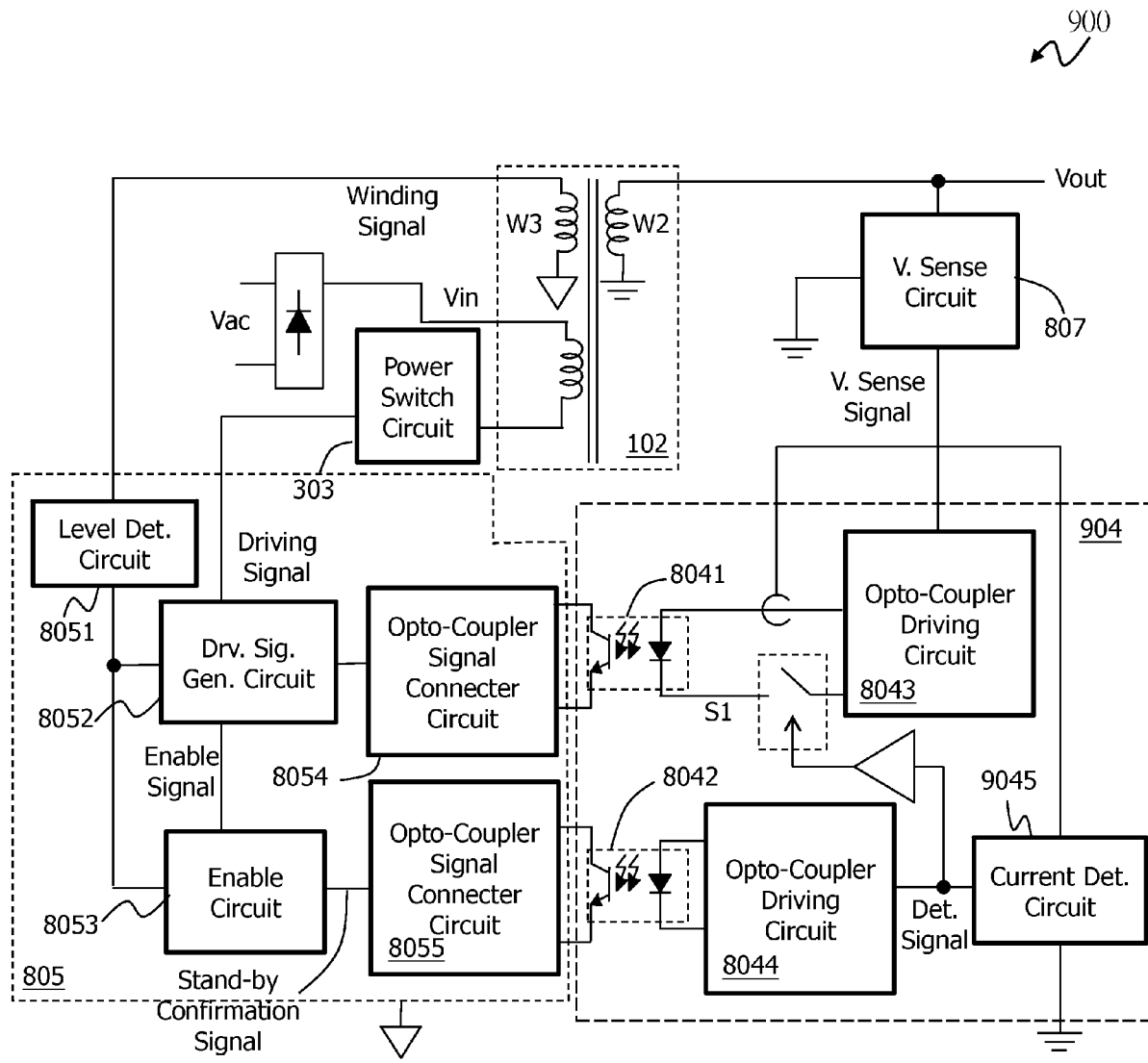
FIG. 11 shows an eighth embodiment of the present invention.

The circuits shown in FIGS. 9A and 9B may be combined, i.e., the control circuit may include both the level determination circuit 8051 and the enable circuit 8053; and the enable circuit 8053 may generate the enable signal according to both the distinguishing signal which is generated by the level determination circuit 8051 and the stand-by confirmation signal which is generated by the opto-coupler signal connecter circuit 8055 (an example will be shown in FIG. 11). In this case, any one or both of the level determination circuit 8051 and the enable circuit 8053 may be considered as the distinguishing circuit 3051 shown in FIG. 3.

FIG. 11 shows an eighth embodiment of the present invention. As shown in FIG. 11, an isolated power converter circuit 900 includes a transformer circuit 102, a power switch circuit 303, an opto-coupler circuit 904, and a control circuit 805. In the stand-by mode, the opto-coupler current generated by the opto-coupler 8041 is relatively higher. In this embodiment, the opto-coupler circuit 904 for example includes a current determination circuit 9045, for determining a high current status (for example, determining whether the opto-coupler current generated by the opto-coupler 8041 is higher than a predetermined current). If yes, the opto-coupler 8042 is enabled to generate the stand-by signal, and the opto-coupler 8041 is turned OFF for a period of time. This period of time for example may have a predetermined length, for example counted by a counter or other methods, or the current determination circuit 9045 may include a hysteresis comparison feature or the like. Or, after the opto-coupler 8041 is turned OFF, whether the opto-coupler 8041 is turned ON again is determined not by the opto-coupler current generated by the opto-coupler 8041, but by other information (such as the output voltage Vout or a winding signal from a winding of the transformer). That is, whether the opto-coupler 8041 is turned OFF may be determined according to the opto-coupler current generated by the opto-coupler 8041, and whether the opto-coupler 8041 is turned ON again may be determined according to time or any suitable information. Certainly, after the opto-coupler 8041 is turned OFF, it is also possible to determine whether to turn ON the opto-coupler 8041 again according to the opto-coupler current generated by the opto-coupler 8041; in this case, the opto-coupler 8041 will switch between ON and OFF, causing higher the power consumption, which is less desired but still within the scope of the present invention. In this embodiment, the current determination circuit 9045 may be considered as part of the distinguishing circuit 3051 or a determination basis for the distinguishing circuit 3051 to determine whether to generate the distinguishing signal. In summary, the distinguishing circuit 3051 may determine the status of the feedback signal according to any related information, for example but not limited to the output voltage Vout (such as the level determination circuit 8045 shown in FIG. 9B, which makes the determination according to the output voltage Vout, and the determination result is transmitted to the enable circuit 8053), a signal related to the output voltage Vout (such as the level determination circuits 4051, 5051, 6051, 7051, and 8051 shown in FIGS. 5-8 and 9A, which makes the determination according to the winding signal from the third winding W3, wherein the winding signal is related to the output voltage Vout), or the feedback signal itself (such as the current determination circuit 9045 shown in FIG. 11, which makes the determination according to the opto-coupler current which is generated by the opto-coupler 8041, i.e., the feedback itself).

Figure 12A:
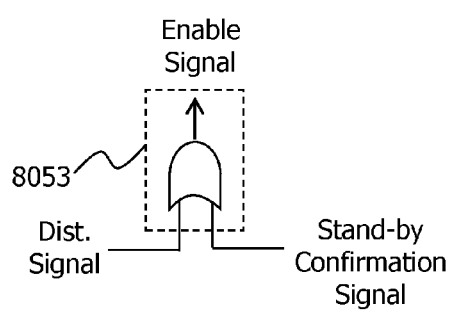
FIGS. 12A-12D show ninth to twelfth embodiments of the present invention.
Figure 12B:
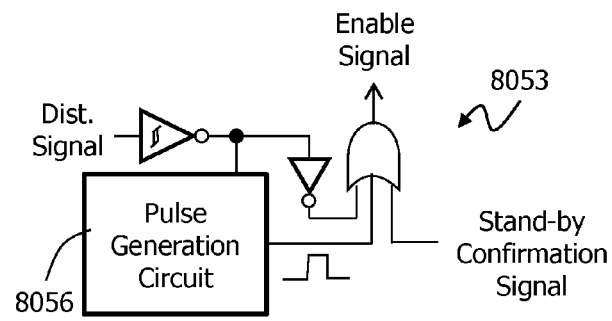
Figure 12C:
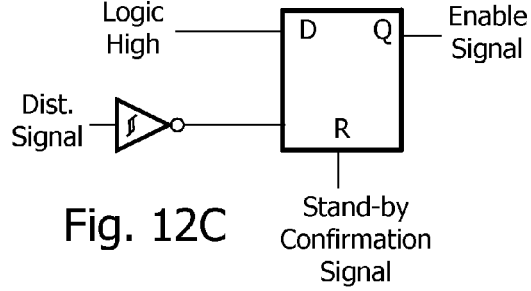
Figure 12D:
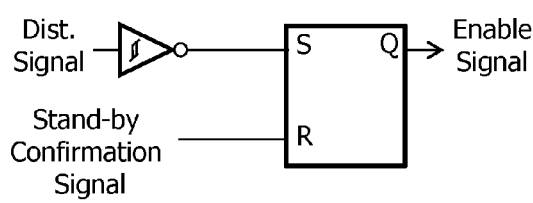

FIGS. 12A-12D show ninth to twelfth embodiments of the present invention, which show more specific embodiments of the enable circuit 8053. As shown in FIG. 12A of the ninth embodiment, the enable circuit 8053 is for example but not limited to an "OR" logic gate, for performing "OR" logic operation of the distinguishing signal (for distinguishing a starting status and a non-starting status here) with the output signal of the opto-coupler signal connecter circuit 8055 (the stand-by confirmation signal), and generating the enable signal, such that the driving signal generation circuit 8052 generates the driving signal according to the stand-by signal which is generated by the opto-coupler 8042 to reduce the power consumption in the stand-by mode. FIGS. 12B-12D show three other different embodiments of the enable circuit 8053, which may include functions such as hysteresis, time delay, status memory, or edge triggering, according to the requirement and application of the circuitry. As shown in FIGS. 12B-12D of the tenth to twelfth embodiments, the enable circuit 8053 includes for example but not limited to a pulse generation circuit 8056 and the "OR" logic gate, or it may be a circuit which includes a flip-flop circuit and a hysteresis signal generation circuit. The aforementioned embodiments of the enable circuit 8053 are only examples but not to limit the scope of the present invention; for example, the enable circuit 8053 may generate the enable signal according to the stand-by confirmation signal only.

Figure 13:
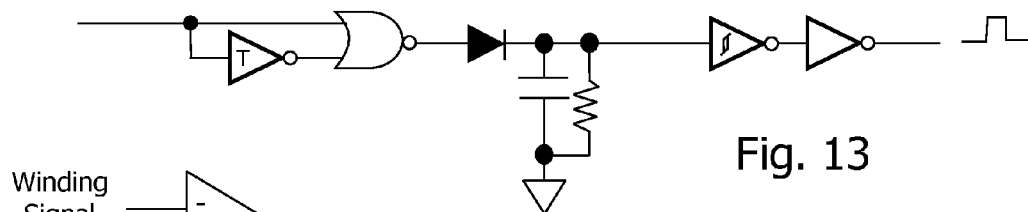
FIG. 13 show a thirteenth embodiment of the present invention.

FIG. 13 shows a thirteenth embodiment of the present invention. This embodiment shows a more specific embodiment of the pulse generation circuit 8056 in the tenth embodiment. As shown in FIG. 13, the pulse generation circuit 8056 includes for example but not limited to an inverter having a delay time T, a logic gate, a diode, a hysteresis signal generation circuit, an RC circuit, and another inverter.

Figure 14A:
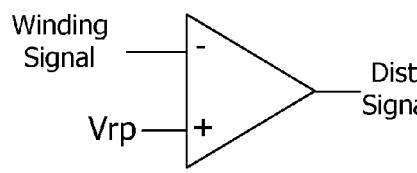
FIGS. 14A-14C show fourteenth to sixteenth embodiments of the present invention.
Figure 14B:
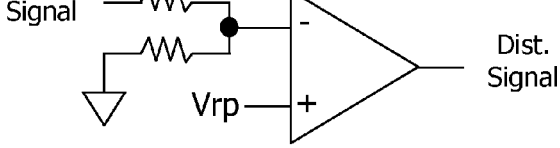
Figure 14C:
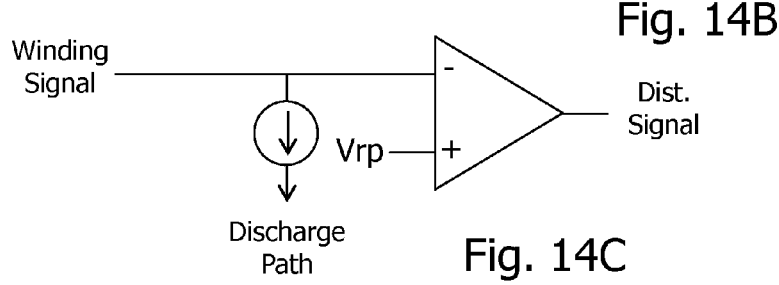

FIGS. 14A-14C show fourteenth to sixteenth embodiments of the present invention, which show more specific embodiments of the level determination circuits 4051, 5051, 6051, 8051, and 8045. As shown in FIGS. 14A-14C, the level determination circuit 4051, 5051, 6051, 8051, and 8045 include for example but not limited to a comparison circuit, which generates the distinguishing signal according to the winding signal and the reverse reference signal Vrp.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device which does not substantially influence the primary function of a signal can be inserted between any two devices in the shown embodiments, such as a switch or the like, so the term "couple" should include direct and indirect connections. For another example, a device which does not substantially influence the primary function of a signal can be omitted between any two devices in the shown embodiments (such as the voltage sense circuit and/or the opto-coupler signal connector circuit may be omitted in some embodiments). For another example, the distinguishing circuit may be located outside the control circuit, instead of inside the control circuit. For another example, the meanings of the high and low levels of a digital signal are interchangeable, with corresponding amendment of the circuits processing these signals. For another example, the positive and negative input terminals of the comparison circuits are interchangeable, with corresponding amendment of the circuits processing these signals. In view of the foregoing, the spirit of the present invention should cover all such and other modifications and variations, which should be interpreted to fall within the scope of the following claims and their equivalents.

What is claimed is:

1. An isolated power converter circuit, comprising:
    a transformer circuit, which includes a first winding and a second winding, configured to operably convert an input voltage to an output voltage;
    a power switch circuit, which is coupled to the first winding, configured to operably control the transformer to convert the input voltage to the output voltage according to a driving signal;
    an opto-coupler circuit, which has a first opto-coupler coupled to the second winding, configured to operably generate a feedback signal according to the output voltage; and
    a control circuit, which are coupled to the power switch circuit and the opto-coupler circuit, configured to operably generate the driving signal according to the feedback signal, wherein the control circuit includes:
        a distinguishing circuit configured to operably generate a distinguishing signal by directly or indirectly determining a status of the feedback signal; and
        a driving signal generation circuit configured to operably determine, by the distinguishing signal, whether or not generating the driving signal according to the feedback signal;
    wherein the isolated power converter circuit has a normal operation mode and a stand-by mode, wherein when the isolated power converter circuit operates in the stand-by mode, an opto-coupler current flowing through the opto-coupler circuit is less than a maximum level of the opto-coupler current flowing through the opto-coupler circuit when the isolated power converter circuit operates in the normal operation mode;
    wherein the opto-coupler circuit further comprises a second opto-coupler, which is coupled to the second winding, and configured to operably generate a stand-by signal according to the output voltage.

2. The isolated power converter circuit of claim 1, wherein the distinguishing circuit includes an enable circuit, which is coupled to the second opto-coupler, and configured to operably generate an enable signal functioning as the distinguishing signal according to the stand-by signal or a signal related to the stand-by signal.

3. The isolated power converter circuit of claim 1, wherein the first opto-coupler is turned OFF when the output voltage is larger than the second predetermined voltage.

4. The isolated power converter circuit of claim 3, wherein the opto-coupler circuit further includes a second level determination circuit, configured to operably turn OFF the first opto-coupler when the output voltage is larger than the second predetermined voltage.

5. The isolated power converter circuit of claim 3, wherein the opto-coupler circuit further includes a current determination circuit, configured to operably turn OFF the first opto-coupler for a period of time when a first opto-coupler current flowing through the first opto-coupler is larger than a predetermined current.

6. The isolated power converter circuit of claim 1, wherein a maximum level of a second opto-coupler current flowing through the second opto-coupler is less than a maximum level of the first opto-coupler current.

7. The isolated power converter circuit of claim 1, wherein:
    a first opto-coupler current flowing through the first opto-coupler circuit is an increasing function which increases as the output voltage increases in the normal operation mode; and
    a second opto-coupler current flowing through the second opto-coupler circuit is an increasing function which increases as the output voltage increases, or the second opto-coupler current is an increasing function which increases as the output voltage increases when the output voltage is relatively low, and the second opto-coupler current is a decreasing function which decreases as the output voltage increases when the output voltage is relatively high.

8. A control circuit of an isolated power converter circuit, wherein the isolated power converter circuit includes: a transformer circuit, which includes a first winding and a second winding, for converting an input voltage to an output voltage; a power switch circuit, which is coupled to the first winding; an opto-coupler circuit, having a first opto-coupler coupled to the second winding, for generating a feedback signal according to the output voltage, the control circuit comprising:
    a distinguishing circuit configured to operably generate a distinguishing signal by directly or indirectly determining a status of the feedback signal; and
    a driving signal generation circuit configured to operably determine, by the distinguishing signal, whether or not generating the driving signal according to the feedback signal;
    wherein the opto-coupler circuit further comprises a second opto-coupler, which is coupled to the second winding, and configured to operably generate a stand-by signal according to the output voltage, and the distinguishing circuit includes an enable circuit, which is coupled to the second opto-coupler, and configured to operably generate an enable signal functioning as the distinguishing signal according to the stand-by signal or a signal related to the stand-by signal.

9. A control method of an isolated power converter circuit, comprising:
    driving the isolated power converter circuit by a driving signal to convert an input voltage to an output voltage;
    generating a first opto-coupler current by opto-coupling according to the output voltage, for generating a feedback signal corresponding to the first opto-coupler current;
    generating a distinguishing signal by directly or indirectly determining a status of the feedback signal;
    determining by the distinguishing signal whether or not generating the driving signal according to the feedback signal;
    wherein the isolated power converter circuit has a normal operation mode and a stand-by mode, wherein when the isolated power converter circuit operates in the stand-by mode, the first opto-coupler current is less than a maximum level of the first opto-coupler current when the isolated power converter circuit operates in the normal operation mode; and generating a second opto-coupler current by opto-coupling according to the output voltage, for generating a stand-by signal.

10. The control method of claim 9, wherein the distinguishing signal is generated according to the stand-by signal.

11. The control method of claim 9 further comprising: stopping generating the first opto-coupler current by opto-coupling when the output voltage is larger than the second predetermined voltage.

12. The control method of claim 9 further comprising: stopping generating the first opto-coupler current by opto-coupling for a period of time when the first opto-coupler current is larger than a predetermined current.

13. The control method of claim 9, wherein the second opto-coupler current is less than a maximum level of the first opto-coupler current.

14. The control method of claim 9, wherein:
the first opto-coupler current is an increasing function which increases as the output voltage increases in the normal operation mode, and
the second opto-coupler current is an increasing function which increases as the output voltage increases, or the second opto-coupler current is an increasing function which increases as the output voltage increases when the output voltage is relatively low, and the second opto-coupler current is a decreasing function which decreases as the output voltage increases when the output voltage is relatively high.

* * * * *